(12) United States Patent
Toyoshima et al.

(10) Patent No.: US 6,596,812 B2
(45) Date of Patent: Jul. 22, 2003

(54) MOLDABLE THERMOPLASTIC RESIN COMPOSITION CONTAINING RUBBER-REINFORCED RESIN AND AN AROMATIC POLYCARBONATE

(75) Inventors: Tetsuro Toyoshima, Tokyo (JP); Toshiyuki Toyoda, Tokyo (JP); Yasuhiko Itou, Tokyo (JP); Kazuki Iwai, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 09/821,804

(22) Filed: Mar. 30, 2001

(65) Prior Publication Data

US 2001/0056158 A1 Dec. 27, 2001

(30) Foreign Application Priority Data

Apr. 6, 2000 (JP) .......................................... 2000-105240

(51) Int. Cl.[7] .............................. C08L 69/00; C08L 55/02
(52) U.S. Cl. ................................... 525/67; 525/316
(58) Field of Search .................................. 525/67, 316

(56) References Cited

U.S. PATENT DOCUMENTS

| | | | | |
|---|---|---|---|---|
| 3,954,905 | A | * | 5/1976 | Margotte |
| 4,042,647 | A | * | 8/1977 | Cornell |
| 4,868,235 | A | | 9/1989 | Muehlbach et al. |
| 4,895,898 | A | * | 1/1990 | Kress |
| 5,679,759 | A | | 10/1997 | Wittmann et al. |
| 5,852,124 | A | * | 12/1998 | Wang |

FOREIGN PATENT DOCUMENTS

| | | |
|---|---|---|
| EP | 0 375 648 | 6/1990 |
| EP | 0 810 242 | 12/1997 |
| EP | 0 953 604 | 11/1999 |
| WO | WO 98/51737 | 11/1998 |

OTHER PUBLICATIONS

Wu et al: "Effect of Polycarbonate Molecular Weight on Polymer Blends of Polycarbonate and ABS," *Journal of Applied Polymer Science*, 50(1993)Nov. 20, No. 8, New York, US, pp. 1379–1389.

Lombardo et al: "Influence of ABS Type on Morphology and Mechanical Properties of PC/ABS Blends," *Journal of Applied Polymer Science*, 54(1994)Dec. 12, No. 11, New York, pp. 1697–1720.

Cheng et al: "Comparison of Some Butadiene–Based Impact Modifiers for Polycarbonate," *Journal of Applied Polymer Science*, 53(1994)Aug. 1, No. 5, New York, US, pp. 513–525.

* cited by examiner

Primary Examiner—David J. Buttner
(74) Attorney, Agent, or Firm—Nixon & Vanderhye

(57) ABSTRACT

The present invention relates to a thermoplastic resin composition comprising 20 to 60 parts by weight of a rubber-reinforced resin (A) and 80 to 40 parts by weight of an aromatic polycarbonate (B) having an average molecular weight of 16,000 to 30,000 ((A)+(B)=100 parts by weight), said rubber-reinforced resin (A) containing a grafted rubber-like polymer (A1) obtained by polymerizing at least one compound (b) selected from the group consisting of aromatic vinyl compounds, vinyl cyanide compounds, (meth)acrylic ester compounds, acid anhydride monomeric compounds and maleimide-based compounds in the presence of a rubber-like polymer (a) having a glass transition temperature of not more than −40° C., the content of the rubber-like polymer (a) in the rubber-reinforced resin (A) being 10 to 70% by weight, and the grafted rubber-like polymer (A1) having such a particle size distribution that the weight percentage of the particles having a size of not less than 80 nm and less than 200 nm is not less than 30%, the weight percentage of the particles having a size of not less than 200 nm and less than 350 nm is not more than 70%, and the weight percentage of the particles having a size of not less than 350 nm is not more than 15%.

9 Claims, No Drawings

MOLDABLE THERMOPLASTIC RESIN COMPOSITION CONTAINING RUBBER-REINFORCED RESIN AND AN AROMATIC POLYCARBONATE

BACKGROUND OF THE INVENTION

The present invention relates to a thermoplastic resin composition, more particularly, it relates to a thermoplastic resin composition having excellent surface impact strength and moldability and containing a rubber-reinforced resin and an aromatic polycarbonate.

Since ABS resins have many advantageous features such as excellent surface appearance of their molded articles, moldability and mechanical properties, ABS resins have been widely utilized in the fields of electric and electronic apparatus, OA equipment, etc., and the polymer alloys comprising such ABS resins and polycarbonates are used for cellular phones, wheel caps, etc. In recent years, efforts have been made for reducing the thickness of the molded articles for the purpose of realizing their weight reduction, but this has brought to the fore the problem of poor moldability and low practical impact strength (such as surface impact resistance) of the conventional polymer alloys.

As a result of the present inventors' earnest study to solve the above problem, it has been found that a thermoplastic resin composition comprising 20 to 60 parts by weight of a rubber-reinforced resin (A) containing a grafted rubber-like polymer (A1) having a specific particle size distribution and 40 to 80 parts by weight of an aromatic polycarbonate (B) having a weight-average molecular weight of 16,000 to 30,000 is excellent in surface impact strength which serves as an index of practical impact resistance of the molded articles.

The present invention has been attained on the basis of the above finding.

SUMMARY OF THE INVENTION

The object of the present invention is to provide a thermoplastic resin composition having excellent surface impact strength and moldability.

To attain the above aim, in the first aspect of the present invention, there is provided a thermoplastic resin composition comprising 20 to 60 parts by weight of a rubber-reinforced resin (A) and 80 to 40 parts by weight of an aromatic polycarbonate (B) having an average molecular weight of 16,000 to 30,000 ((A)+(B)=100 parts by weight), said rubber-reinforced resin (A) containing a grafted rubber-like polymer (A1) obtained by polymerizing at least one compound (b) selected from the group consisting of aromatic vinyl compounds, vinyl cyanide compounds, (meth)acrylic ester compounds, acid anhydride monomeric compounds and maleimide-based compounds in the presence of a rubber-like polymer (a) having a glass transition temperature of not more than $-40°$ C., the content of the rubber-like polymer (a) in the rubber-reinforced resin (A) being 10 to 70% by weight, and the grafted rubber-like polymer (A1) having such a particle size distribution that the weight percentage of the particles having a size of not less than 80 nm and less than 200 nm is not less than 30% by weight, the weight percentage of the particles having a size of not less than 200 nm and less than 350 nm is not more than 70% by weight, and the weight percentage of the particles having a size of not less than 350 nm is not more than 15% by weight.

In the second aspect of the present invention, there is provided a thermoplastic resin composition comprising 20 to 60 parts by weight of a rubber-reinforced resin (A) and 40 to 80 parts by weight of an aromatic polycarbonate (B) having a weight-average molecular weight of 16,000 to 30,000 ((A)+(B)=100 parts by weight), said rubber-reinforced resin (A) containing a grafted rubber-like polymer (Al) obtained by polymerizing at least one compound (b) selected from the group consisting of aromatic vinyl compounds, vinyl cyanide compounds, (meth)acrylic ester compounds, acid anhydride monomeric compounds and maleimide-based compounds in the presence of a rubber-like polymer (a) which has such a particle size distribution that the weight percentage of the particles having a size of not less than 80 nm and less than 200 nm is not less than 30% by weight, the weight percentage of the particles having a size of not less than 200 nm and less than 350 nm is not more than 70% by weight, and the weight percentage of the particles having a size of not less than 350 nm is not more than 15% by weight, and which rubber-like polymer (a) has a glass transition temperature of not more than $-40°$ C., and the content of the rubber-like polymer (a) in the rubber-reinforced resin (A) being 10 to 70% by weight.

In the third aspect of the present invention, there is provided a thermoplastic resin composition comprising 20 to 60 parts by weight of a rubber-reinforced resin (A) and 40 to 80 parts by weight of an aromatic polycarbonate (B) having a weight-average molecular weight of 16,000 to 30,000 ((A)+(B)=100 parts by weight), said rubber-reinforced resin (A) containing at least two following grafted rubber-like polymers, namely a first grafted rubber-like polymer (All) obtained by graft polymerizing at least one first monomeric compound (b1) selected from the group consisting of aromatic vinyl compounds, vinyl cyanide compounds, (meth)acrylic ester compounds, acid anhydride monomeric compounds and maleimide-based compounds in the presence of a first rubber-like polymer (a1) having a specified particle size distribution and a glass transition temperature of not more than $-40°$ C., and a second grafted rubber-like polymer (A12) obtained by graft polymerizing at least one second monomeric compound (b2) selected from the group consisting of aromatic vinyl compounds, vinyl cyanide compounds, (meth)acrylic ester compounds, acid anhydride monomeric compounds and maleimide-based compounds in the presence of a second rubber-like polymer (a2) having a specific particle size distribution different from that of the first rubber-like polymer (a1) and a glass transition temperature of not more than $-40°$ C., said grafted rubber-like polymers in the rubber-reinforced resin (A) having such a particle size distribution that the weight percentage of the particles having a size of not less than 80 nm and less than 200 nm is not less than 30% by weight, the weight percentage of the particles having a size of not less than 200 nm and less than 350 nm is not more than 70% by weight, and the weight percentage of the particles having a size of not less than 350 nm. is not more than 15% by weight, and the content of the rubber-like polymers (a) comprising at least the first rubber-like polymer (a1) and the second rubber-like polymer (a2) in the rubber-reinforced resin (A) being 10 to 70% by weight, and the overall amount of the monomeric compounds (b) comprising at least the first monomeric compound (b1) and the second monomeric compound (b2) being 90 to 30% by weight (the sum of the overall amount of said rubber-like polymers (a) and the overall amount of said compounds (b) being 100% by weight).

DETAILED DESCRIPTION OF THE INVENTION

In the thermoplastic resin composition according to the first or any other aspect of the present invention, it is essential that the particle size distribution of the grafted rubber-like polymer (A1) falls within the specified range, irrespective of the production process used. For example, the thermoplastic resin composition according to the second aspect or the third aspect of the present invention is also specified by the fact that the obtained particle size distribution falls within the above-defined range.

In the particle size distribution of the grafted rubber-like polymer (A1) according to the first aspect or the grafted rubber-like polymer (A1=A11+A12+A13 . . . ) according to the third aspect, the percentage of the particles having a size of not less than 80 nm and less than 200 nm is not less than 30% by weight, preferably not less than 40% by weight, especially 40 to 80% by weight. The percentage of the particles having a size of not less than 200 nm and less than 350 nm is not more than 70% by weight, preferably not more than 60% by weight, especially 20 to 60% by weight, and the percentage of the particles having a size of not less than 350 nm is not more than 15% by weight, preferably not more than 10% by weight, especially 0 to 10% by weight.

The particle size distribution of the grafted rubber-like polymer (A1) in the present invention is closely associated with rubber orientation during molding, and surface impact strength is bettered when the particle size distribution falls within the above-defined range. "Rubber orientation" is a phenomenon of the rubber particles being deformed in the flowing direction by the shear stress during molding. Surface impact strength lowers when this rubber orientation is enlarged. In the first or third aspect of the present invention, in case where the percentage of the particles having a size of not less than 80 nm and less than 200 nm is too low, surface impact strength lowers as the stress dispersing effect of the rubber particles is reduced. On the other hand, a too high percentage of the particles having a size of not less than 350 nm encourages the orientation to lower the surface impact strength.

In the particle size distribution of the rubber-like polymer (a) in the second aspect of the present invention, the percentage of the particles having a size of not less than 80 nm and less than 200 nm is not less than 30% by weight, preferably not less than 40% by weight, especially 40 to 80% by weight. The percentage of the particles having a size of not less than 200 nm and less than 350 nm is not more than 70% by weight, preferably not more than 60% by weight, especially 20 to 60% by weight, and the percentage of the particles having a size of not less than 350 nm is not more than 15% by weight, preferably not more than 10% by weight, especially 0 to 10% by weight. In case where the percentage of the particles having a size of not less than 80 nm and less than 200 nm is too low, or in case where the percentage of the particles having a size of not less than 350 nm is too high, there arises the same problem as in the case of the grafted rubber-like polymer (A1) described above.

The particle size of the grafted rubber-like polymer (A1) in the first and third aspects of the present invention is specified as follows. When a thermoplastic resin composition of the present invention is stained with osmium tetroxide, the stained grafted rubber-like polymer particles can be observed under a transmission electron microscope. In this case, the rubber-like polymer particle portion alone is stained, and the graft polymerized portion formed around the grafted rubber-like polymer (A1) remains unstained, so that the particle size actually measured by this method is the outer diameter of the particles of the rubber-like polymer portion excluding the graft polymerized portion formed therearound. Thus, the particle size of the rubber-like polymer (A1) in the first and third aspects of the present invention is the outer diameter of the particles of the rubber-like polymer portion excluding the graft polymerized portion formed therearound.

The particle size of the rubber-like polymer (a) in the second aspect of the present invention is the outer diameter of the rubber-like polymer particles per se before undergoing the graft polymerization.

The "glass transition temperature" of the rubber-like polymer (a) in the first, second and third aspects of the present invention is not more than −40° C., preferably not more than −50° C. more preferably not more than −60° C. If this temperature exceeds −40° C., the surface impact strength of the composition at low temperatures deteriorates.

In the first, second and third aspects, the "graft ratio of the grafted rubber-like polymer (A1)" means the ratio of the monomeric compound (b) grafted to the rubber-like polymer, and it is calculated from the following equation.

Graft ratio (%)=100×(T−S)/S wherein S is the weight of the rubber-like polymer in 1 g of the rubber-reinforced resin, which weight is calculated from the feed of the resin; and T is the weight of the methyl ethyl ketone insoluble matter, which was determined in the following way: 1 g of the rubber-reinforced resin was supplied into 50 ml of methyl ethyl ketone and shaken at room temperature for 2 hours, then the free (co)polymer was dissolved therein, the resulting solution being centrifuged at 15,000 rpm for 30 minutes, then the obtained insoluble matter was dried by a vacuum dryer at 120° C. for one hour, and the weight of the dried product was measured.

The graft ratio in the first, second and third aspects is preferably in the range of 20 to 100%, more preferably 40 to 100%, even more preferably 50 to 100%. A too low graft ratio results in low surface impact strength of the produced thermoplastic resin composition while a too high graft ratio leads to poor fluidity of the composition.

The "rubber-like polymer (a)" is a polymer having the rubber-like properties, the examples of which include polybutadiene, styrene-butadiene copolymer, styrene-isoprene copolymer, butadiene-acrylonitrile copolymer, ethylene-propylene-(nonconjugated diene) copolymer, ethylene-1-(nonconjugated diene) copolymer, isobutylene-isoprene copolymer, acrylic rubber, styrene-isoprene-styrene block copolymer, polyurethane rubber, and silicone rubber. The said styrene-butadiene copolymer includes styrene-butadiene random copolymer, styrene-butadiene block copolymer and styrene-butadiene-styrene block copolymer. These styrene-butadiene copolymers may be hydrogenated. The rubber-like polymers (a) according to the present invention may be used either singly or by combining two or more of them. The preferred examples of (a) in the present invention are polybutadiene and styrene-butadiene copolymer.

As the "aromatic vinyl compound" in the "monomeric compound (b)" used for the polymerization in the presence of the said rubber-like polymer (a), the following can be cited as examples: styrene, αmethylstyrene, o-methylstyrene, p-methylstyrene, t-butylstyrene, vinyltoluene, methyl-α-methylstyrene, divinylbenzene, 1,1-diphenylstyrene, vinylxylene, N,N-diethyl-p-aminoethylstyrene, N,N-diethyl-p-aminomethylstyrene, and vinylpyridine. Styrene and α-methylstyrene are preferred.

Examples of the "vinyl cyanide compound" in the said "monomeric compound (b)" include acrylonitrile, methacrylonitrile, crotononitrile, and nitrile cinnamate. Of these compounds, acrylonitrile and methacrylonitrile are preferred.

As the "(meth)acrylic ester compound" in the "monomeric compound (b)" there are exemplified: (1) acrylic alkyl esters such as methyl acrylate, ethyl acrylate, propyl acrylate, butyl acrylate, amyl acrylate, hexyl acrylate, octyl acrylate, 2-ethylhexyl acrylate, cyclohexyl acrylate and phenyl acrylate, and (2) methacrylic alkyl esters such as methyl methacrylate, ethyl methacrylate, propyl methacrylate, butyl methacrylate, amyl methacrylate, hexyl methacrylate, octyl methacrylatle, 2-ethylhexyl methacrylate, cyclohexyl methacrylate, dodecyl methacrylate, octadecyl methacrylate, phenyl methacrylate and benzyl methacrylate. Of these esters, butyl acrylate and methyl methacrylate are preferably used.

As the "acid anhydride monomeric compound" in the said "monomeric compound (b)", itaconic anhydride and citraconic anhydride can be exemplified.

As the "maleimide-based compound" in the said "monomeric compound (b)", maleimide, N-methylmaleimide, N-butylmaleimide, N-phenylmaleimide, N-(2-methylphenyl)maleimide, N-(4-hydroxyphenyl)maleimide, and N-cyclohexylmaleimide can be exemplified.

Beside the said "monomeric compound (b)", there can be used where necessary other monomeric compounds such as 2-hydroxyethyl acrylate, 2-hydroxyethyl methacrylate, glycidyl acrylate, glycidyl methacrylate, aminomethyl methacrylate, aminopropyl methacrylate, 2-cyanoethyl acrylate, 2-cyanoethyl methacrylate, 2-cyanopropyl acrylate, and 2-cyanopropyl methacrylate.

The content (% by weight) of the rubber-like polymer (a) constituting the grafted rubber-like polymer (A1) of the present invention is 10 to 70% by weight, preferably 15 to 70% by weight, more preferably 20 to 65% by weight, provided that the sum of the rubber-like polymer (a) and the monomeric compound (b) used for the polymerization is 100% by weight. If the content of (a) is less than 10% by weight, the produced composition may be poor in surface impact strength, while if the content of (a) exceeds 70% by weight, the composition proves to may be poor in moldability.

As the method for polymerizing the monomeric compound (b) in the presence of a specific rubber-like polymer (a) for producing the rubber-reinforced resin (A) in the present invention, various polymerization methods such as emulsion polymerization, solution polymerization, bulk polymerization and suspension polymerization can be used, but emulsion polymerization or solution polymerization is preferred.

When producing the rubber-reinforced resin (A) of the present invention by emulsion polymerization, there are used a polymerization initiator, a chain transfer agent (molecular weight modifier), an emulsifier and water. As for the mode of use of the rubber-like polymer (a) and the monomeric compound (b) in the production of the rubber-reinforced resin (A), the monomeric compound (b) may be used all at one time or may be added in portions or continuously in the presence of the whole amount of the rubber-like polymer (a). Any suitable combination of these modes of use may be adopted. Also, the whole amount or part of the rubber-like polymer (a) may be added in the course of polymerization.

As the polymerization initiator, it is possible to use, for instance, redox polymerization initiators comprising combinations of organic hydroperoxides such as cumene hydroperoxide, diisopropylbenzene hydroperoxide, paramenthane hydroperoxide, etc., and reducing agents such as sugar-containing pyrophosphoric acid-based or sulfoxylate-based ones; persulfates such as potassium persulfate; azo-bisisobutyronitrile (AIBN); and peroxides such as, benzoyl peroxide (BPO), lauroyl peroxide, t-butyl peroxylaurate and t-butyl peroxymonocarbonate. The polymerization initiator may be added all at one time or continuously. Its amount used is usually 0.1 to 1.5% by weight, preferably 0.2 to 0.7% by weight, based on the monomeric compound (b).

As the chain transfer agent, it is possible to use those known in the art, which include mercaptans such as octylmercaptan, n-dodecylmercaptan, t-dodecylmercaptan, n-hexylmercaptan, n-hexadecylmercaptan, n-tetradecylmercaptan and t-tetradecylmercaptan, hydrocarbon salts such as carbon tetrachloride, ethylene bromide and pentaphenylethane, terpenes, acrolein, metacrolein, allyl alcohol, 2-ethylhexylthio glycol, α-methylstyrene dimers, and the like. These chain transfer agents may be used either singly or by combining two or more of them. Such a chain transfer agent is used in an amount of usually 0.05 to 2% by weight based on the monomeric compound (b).

The known emulsifiers can be used for the emulsion polymerization in the present invention, examples of such emulsifiers including sulfuric esters of higher alcohols, alkylbenzenesulfonates such as sodium dodecylbenzenesulfonate, aliphatic sulfonates such as sodium laurylsulfonate, higher aliphatic carbonates, rosinates, anionic surfactants such as phosphoric acid type, alkyl esters of polyethylene glycol, and nonionic surfactants such as alkyl ether type. These emulsifiers may be used either singly or by combining two or more of them. The amount of the emulsifier used for the emulsion polymerization is usually 0.3 to 5% by weight based on the monomeric compound (b).

In the emulsion polymerization, usually the powder obtained by solidifying the polymerization material by a solidifying agent is washed with water and then dried to obtain a powder of the rubber-reinforced resin. As the solidifying agent, inorganic salts such as calcium chloride, magnesium sulfate, magnesium chloride, sodium chloride, etc., and acids such as sulfuric acid, hydrochloric acid, etc., can be used.

In the said rubber-reinforced resin (A), it is possible to contain a polymer obtained by separately polymerizing at least one compound (b) selected from the group consisting of aromatic vinyl compounds, vinyl cyanide compounds, (meth)acrylic ester compounds and acid anhydride monomeric compounds. Among these compounds, usually a copolymer of an aromatic vinyl compound and a vinyl cyanide compound, especially an acrylonitrile-styrene copolymer is used. In case of using a copolymer, its composition may be the same as or different from that of the said monomeric compound (b). Also, the said polymer may be a combination of two or more polymers, and in this case, solution polymerization is preferably used.

The weight-average molecular weight, as determined by GPC with polystyrene calibration, of the acetone-soluble matter of the said rubber-reinforced resin (A) falls within the range of 60,000 to 180,000, preferably 70,000 to 180,000, more preferably 80,000 to 170,000. If the said weight-average molecular weight is less than 60,000, the molded articles obtained by using the thermoplastic resin of the present invention are found unsatisfactory in surface impact strength, while if it exceeds 180,000, moldability of the composition deteriorates, making it difficult to obtain the thin-wall molded articles.

The said acetone-soluble matter can be obtained by supplying the rubber-reinforced resin (A) into acetone, shaking the mixture at 25° C. for 2 hours, and centrifuging the solution at 23,000 rpm for 30 minutes to separate the soluble matter and the unnecessary portion.

The amount of the rubber-reinforced resin (A) used in the present invention is within the range of 20 to 60 parts by weight, preferably 20 to 55 parts by weight, more preferably 25 to 50 parts by weight, based on 100 parts by weight of the aromatic polycarbonate (B). If the amount of (A) is less than 20 parts by weight, the produced composition proves to be unsatisfactory in surface impact strength, and if it exceeds 60 parts by weight, heat resistance of the composition becomes intolerably low.

The type of the "aromatic polycarbonate (B)" usable in the present invention is diversified. For instance, it is possible to use (1) those obtained from a reaction of various types of dihydroxyaryl compounds and phosgene (phosgene method), and (2) those obtained from an ester exchange reaction of dihydroxyaryl compounds and diphenyl carbonates (ester exchange method). A typical example of such aromatic polycarbonates is 2,2'-bis(4-hydroxyphenyl) propane, i.e. a polycarbonate obtained from a reaction of bisphenol A and phosgene.

Examples of the dihydroxyarryl compounds usable as a starting material of the polycarbonates (B) include bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxyphenyl)phenylmethane, 2,2'-bis(4-hydroxy-3-methylphenyl)propane, 2,2'-bis(4-hydroxy-3-t-butylphenyl)propane, 2,2'-bis(4-hydroxy-3-bromophenyl) propane, 2,2'-bis(4-hydroxy-3,5-dichlorophenyl)propane, 1,1'-bis(4-hydroxyphenyl)cyclopentane, 1,1'-bis(4-hydroxyphenyl)cyclohexane, 4,4'-dihydroxydiphenyl ether, 4,4'-dihydroxyphenyl sulfide, 4,4'-dihydroxy-3,3'-dimethylphenyl sulfide, 4,4'-dihydroxydiphenyl sulfoxide, 4,4'-dihydroxyphenyl sulfoxide, 4,4'-dihydroxydiphenyl sulfone, 4,4'-dihydroxy-3,3'-dimethyldiphenyl sulfone, hydroquinone, and resorcin. These compounds may be used either singly or by combining two or more of them.

The weight-average molecular weight of the said aromatic polycarbonate (B) is 16,000 to 30,000, preferably 17,000 to 28,000, more preferably 18,000 to 26,000. If its weight-average molecular weight is less than 16,000, the obtained composition may be poor in surface impact strength, and if it exceeds 30,000, moldability of the composition may be deteriorated. In case of using two or more types of aromatic polycarbonate, it is simply required to select them so that the weight-average molecular weight of the mixture will fall within the above-defined range.

In the thermoplastic resin composition according to the first aspect of the present invention, the content of the rubber-like polymer (a) in the total amount of the component (A) and the component (B) is preferably 5 to 40% by weight, more preferably 7 to 30% by weight, even more preferably 10 to 28% by weight. If the content of (a) is less than 5% by weight, it is hardly possible to obtain satisfactory surface impact strength, and if the content exceeds 40% by weight, it is difficult to obtain desired moldability and hardness of the composition.

In the thermoplastic resin composition of the present invention, it is possible to contain where necessary one or more fillers such as glass fiber, carbon fiber, wollastonite, talc, mica, kaolin, glass beads, glass flakes, mild fiber, zinc oxide whisker, potassium titanate whisker, etc. Incorporation of such filler(s) provides rigidity to the composition. Especially, presence of talc or the like in the composition imparts a matte effect to the composition. The preferred size of glass fiber or carbon fiber contained in the composition is 6 to 20 $\mu$m in diameter and not less than 30 $\mu$m in length.

In the thermoplastic resin composition of the present invention, it is also possible to blend the known additives such as coupling agent, flame retardant, antibacterial agent, mildew-proofing agent, antioxidant, weathering agent (light stabilizer), plasticizer, colorant (pigment, dye, etc.), antistatic agent, etc., within limits not affecting the required performance of the composition.

In the composition of the present invention, it is further possible to blend other (co)polymer(s) according to the required performance of the composition. Among such other (co)polymers are polyamides, polyesters, polysulfone, polyether sulfone, polyphenylene sulfide, liquid crystal polymers, polyvinylidene fluoride, styrene-vinyl acetate copolymer, polyamide elastomers, polyamide-imide elastomers, polyester elastomers, phenol resins, epoxy resins and novolak resins.

The thermoplastic resin composition of the present invention can be obtained by mixing and kneading the component materials by a suitable means such as various types of extruder, Banbury mixer, kneader, roll mill, feeder ruder, etc. An extruder or a Banbury mixer is preferably used. When kneading the component materials, they may be kneaded all at one time or in several portions. Also, after kneaded by a Banbury mixer, kneader or such means, the mixture may be pelletized by an extruder.

The thus obtained thermoplastic resin composition of the present invention can be molded into various parts and articles in the fields of OA equipment, domestic electrical appliances, electric and electronic devices, communications, computers, miscellaneous products, sanitary goods, vehicles, etc., by an appropriate molding method such as injection molding, sheet-extrusion, vacuum forming, profile molding, expansion molding, injection press molding, pressure molding, blow molding, etc.

It is particularly notable that the thermoplastic resin composition of the present invention exhibits its excellent performance in surface impact strength and moldability. Therefore, its molded products can be used advantageously in many fields of industries such as OA equipment, domestic electrical appliances, electric and electronic devices, communications, computers, miscellaneous products, sanitary goods, vehicles, etc. It finds particularly useful application to the thin-wall molded articles designed for reducing weight.

EXAMPLES

The present invention will hereinafter be described in further detail by showing the examples thereof, but it is to be understood that the present invention is not limited in its scope by these examples. In the following Examples and Comparative Examples, all "parts" and "%" are by weight unless otherwise noted.

Evaluation and Determination Methods

The evaluation and determination methods used in the Examples and the Comparative Examples are as described below.

(1) Determination of particle size distribution of the rubber-like polymer

A molded product of the thermoplastic resins composition was cut into a piece having a thickness of 800 to 1,200 Å (the region where the cut piece presents a silver to gold color by the interference of light) by a microtome, then this piece was stained with osmium tetroxide and the distribution of the particles was observed through a transmission electron microscope. The obtained micrographs were subjected to image analysis to determine the particle size distribution of the rubber-like polymer in the thermoplastic resin composition.

(2) Determination of particle size distribution of rubber-like polymer in rubber-like polymer latex The particle size distribution of the rubber-like polymer in the rubber-like polymer latex was determined by the light scattering method using a laser particle size analyzer "LPA3100" (Otsuka Denshi KK). A 70-integration cumulant method was used for the determination.

(3) Weight-average molecular weight of polycarbonate

An aromatic polycarbonate was dissolved in methylene chloride, and 5 specimens differing in concentration were prepared. Reduced viscosities of the specimens of the respective concentrations were measured by an Ubbellohde viscometer at 20° C., and intrinsic viscosity was determined from the obtained values of reduced viscosity. From the determined value of intrinsic viscosity, the Mark-Houwink constants were given as: $\kappa=1.23\times10^{-4}$; $\alpha=0.83$.

(4) Weight-average molecular weight of acetone-soluble matter

The acetone-soluble matter of the rubber-reinforced resin and a separately prepared acrylonitrile-styrene copolymer were extracted, and their weight-average molecular weight was determined by GPC with polystyrene calibration.

(5) Surface impact strength (evaluated by drop impact strength)

Breaking energy of a 50×80×2.4 mm thick test piece was determined by a high-speed impact tester Servo Pulser EHE-2H-20L (Shimadzu Corp.) under the following conditions: test piece bearer diameter=30 φ; striking rod end=12.7 R; striking speed=3.1 m/s. Unit: kgf·mm, measuring temperature: 23° C.

2. Preparation of rubber-like polymer

Polybutadiene latex preparations shown in Table 1 were used as the rubber-like polymer specimens (a) to (c). Glass transition temperature of the preparations was also shown in Table 1.

TABLE 1

| Rubber-like polymer | (a) | (b) | (c) |
|---|---|---|---|
| Polybutadiene latex particle size distribution (wt %) | | | |
| Not less than 80 nm and less than 200 nm | 70 | 20 | 16 |
| Not less than 200 and Less than 350 nm | 20 | 80 | 64 |
| Not less than 350 nm | 10 | 0 | *20 |
| Glass transition temperature Tg (° C.) | −80 | −80 | −80 |

TABLE 1-continued

| Rubber-like polymer | (a) | (b) | (c) |
|---|---|---|---|

The figure with * mark in the table indicates a value outside the specified range of the present invention or an unsatisfactory performance value.

3. Preparation of rubber-reinforced resin 1.5 part of potassium rosinate, 0.1 part of t-dodecylmercaptan, 100 parts of ion exchange water and the first-stage polymerization materials shown in Table 2 were added to a 7-liter glass-made flask equipped with a stirrer, and the solution was heated to 45° C. with stirring. Then an aqueous activator solution comprising 0.1 part of sodium ethylenediaminetetracetate, 0.003 part of ferrous sulfate, 0.2 part of formaldehyde sodium sulfoxylate dihydrate and 15 parts of ion exchange water, and 0.1 part of cumene hydroperoxide were added, and the reaction was continued for one hour. Thereafter, the second-stage polymerization materials shown in Table 2 and the incremental polymerization materials comprising 1 part of potassium rosinate salt, 0.1 part of t-dodecylmercaptan, 0.2 part of diisopropylbenzene hydroperoxide and 50 parts of ion exchange water were added continuously over a period of 3 hours, carrying on the polymerization reaction. After the completion of the addition of the above materials, the solution was further stirred for one hour, then 0.2 part of 2,2-methylene-bis-(4-ethylene-6-t-butylphenol) was added, and the reaction product was taken out of the flask. The latex of the reaction product was solidified with 2 parts of calcium chloride, and the reaction product was washed well with water and then dried at 75° C. for 24 hours to obtain a rubber-reinforced resin (A-1) as a white powder. There were also obtained the rubber-reinforced resin preparations (A-2) and (A-3) in the same way. Graft ratio and polymerization conversion are also shown in Table 2.

TABLE 2

| Rubber-reinforced resin | A-1 | A-2 | A-3 |
|---|---|---|---|
| First-stage polymerization materials (parts by weight) | | | |
| Rubber latex (a) | 40 | — | — |
| Rubber latex (b) | — | 40 | — |
| Rubber latex (c) | — | — | 40 |
| Styrene | 9 | 11 | 9 |
| Acrylonitrile | 3 | 4 | 3 |
| Second-stage polymerization materials (parts by weight) | | | |
| Styrene | 34 | 32 | 34 |
| Acrylonitrile | 14 | 13 | 14 |
| Graft ratio (%) | 80 | 50 | 75 |
| Polymerization conversion (%) | 98 | 97 | 98 |

(4) Aromatic polycarbonates

The following aromatic polycarbonates were used.
(B-1): Polycarbonate having a weight-average molecular weight of 19,000.
(B-2): Polycarbonate having a weight-average molecular weight of 23,000.
(B'-1): Polycarbonate having a weight-average molecular weight of 15,000.
(B'-2): Polycarbonate having a weight-average molecular weight of 31,000.

5. Preparation of acrylonitrile-styrene resin

The following acrylonitrile-styrene resins to be contained in the rubber-reinforced resin were prepared. (C-1): Acrylonitrile content: 25 wt %; Mw: 140,000 (C-2): Acrylonitrile content: 24 wt %; Mw: 95,000

Examples 1 to 6 and Comparative Examples 1 to 3

The above component materials were mixed at the formulations shown in Table 3 by a Henschel mixer for 3 minutes. The mixture was melt extruded by a 50 mm vented extruder Model NVC (Nakatani Machinery Co., Ltd.) at a cylinder temperature of 220 to 250° C. to obtain the pellets. The pellets were dried well and injection molded by an injection molding machine J100E-C5 (Japan Steel Works, Ltd.) at a cylinder temperature of 240° C. and a mold temperature of 50° C. to obtain an impact resistance test piece. Evaluation results are also shown in Table 3.

TABLE 3

| Composition (wt %) | Example 1 | Example 2 | Example 3 | Example 4 |
|---|---|---|---|---|
| Rubber-reinforced resin | | | | |
| (A-1) | 30 | 15 | 25 | 15 |
| (A-2) | — | 15 | — | 15 |
| (A-3) | — | — | — | — |
| (C-1) | 15 | 15 | — | — |
| (C-2) | — | — | 20 | 15 |
| Polycarbonate | | | | |
| (B-1) Mw: 19,000 | 55 | 55 | — | — |
| (B-2) Mw: 23,000 | — | — | 55 | 55 |
| (B'-1) *Mw: 15,000 | — | — | — | — |
| (B'-2) *Mw: 31,000 | — | — | — | — |
| Particle size distribution of rubber-reinforced resin of molded article (wt %) | | | | |
| 80~200 nm exclusive | 70 | 45 | 70 | 45 |
| 200~350 nm exclusive | 20 | 50 | 20 | 50 |
| not less than 350 nm | 10 | 5 | 10 | 5 |
| Drop impact strength (kgf · mm) | 218 | 574 | 211 | 520 |
| Moldability | Good | Good | Good | Good |
| Mw of acetone-soluble matter of rubber-reinforced resin | 140,000 | 140,000 | 95,000 | 95,000 |

| Composition (wt %) | Comp. Example 1 | Comp. Example 2 | Comp. Example 3 |
|---|---|---|---|
| Rubber-reinforced resin | | | |
| (A-1) | — | 30 | 30 |
| (A-2) | — | — | — |
| (A-3) | 30 | — | — |
| (C-1) | 15 | 15 | 15 |
| (C-2) | — | — | — |
| Polycarbonate | | | |
| (B-1) Mw: 19,000 | 55 | — | — |
| (B-2) Mw: 23,000 | — | — | — |
| (B'-1) *Mw: 15,000 | — | 55 | — |
| (B'-2) *Mw: 31,000 | — | — | 55 |
| Particle size distribution of rubber-reinforced resin of molded article (wt %) | | | |
| 80~200 nm exclusive | *16 | 70 | 70 |
| 200~350 nm exclusive | 64 | 20 | 20 |
| not less than 350 nm | *20 | 10 | 10 |
| Drop impact strength (kgf · mm) | *31 | *10 | 220 |
| Moldability | Good | Good | bad |
| Mw of acetone-soluble matter of rubber-reinforced resin | 140,000 | 140,000 | 140,000 |

The figure with * mark in the table indicates a value outside the specified range of the present invention or an unsatisfactory performance value.

As is apparent from the results of Examples 1 to 4 shown in Table 3, any of the thermoplastic resin compositions according to the present invention is excellent in drop impact strength and workability. Examples 1 and 3 show that even if the composition contains as much as 70% by weight of a grafted rubber-like polymer having a particle size of not less than 80 nm and less than 200 nm, it has sufficient drop impact resistance and good workability if the weight-average molecular weight of the aromatic polycarbonate contained is within the range specified in the present invention. Further, in case where the grafted rubber-like polymer having a particle size of not less than 200 nm and less than 350 nm was contained in an amount of as much as 50% by weight as in Examples 2 and 4, drop impact strength was more than doubled.

In contrast, in Comparative Example 1 where the amount of the grafted rubber-like polymer having a particle size of not less than 80 nm and less than 200 nm was reduced below the specified range of the present invention, drop impact strength was poor. In Comparative Example 2 where the weight-average molecular weight of the aromatic polycarbonate was below the defined range of the present invention, drop impact strength was even worse than that in Comparative Example 1. In Comparative Example 3 where the weight-average molecular weight of the aromatic polycarbonate was above the defined range of the present invention, drop impact strength was comparable with that of Examples 1 and 3 but moldability was poor.

What is claimed is:

1. A thermoplastic resin composition comprising 20 to 60 parts by weight of a rubber-reinforced resin (A) and 80 to 40 parts by weight of an aromatic polycarbonate (B) having an average molecular weight of 16,000 to 30,000 ((A)+(B)=100 parts by weight), said rubber-reinforced resin (A) containing a grafted rubber-like polymer (A1) obtained by polymerizing at least one compound (b) selected from the group consisting of aromatic vinyl compounds, vinyl cyanide compounds, (meth)acrylic ester compounds, acid anhydride monomeric compounds and maleimide-based compounds in the presence of a rubber-like polymer (a) having a glass transition temperature of not more than −40° C, the content of the rubber-like polymer (a) in the rubber-reinforced resin (A) being 10 to 70% by weight, and the grafted rubber-like polymer (A1) having such a particle size distribution that the weight percentage of the particles having a size of not less than 80 nm and less than 200 nm is 40 to 80% by weight, the weight percentage of the particles having a size of not less than 200 nm and less than 350 nm is 20 to 60% by weight, and the weight percentage of the particles having a size of not less than 350 nm is not more than 10% by weight.

2. A thermoplastic resin composition comprising 20 to 60 parts by weight of a rubber-reinforced resin (A) and 40 to 80 parts by weight of an aromatic polycarbonate (B) having a weight-average molecular weight of 16,000 to 30,000 ((A)+(B)=100 parts by weight), said rubber-reinforced resin (A) containing a grafted rubber-like polymer (A1) obtained by polymerizing at least one compound (b) selected from the group consisting of aromatic vinyl compounds, vinyl cyanide compounds, (meth)acrylic ester compounds, acid anhydride monomeric compounds and maleimide-based compounds in the presence of a rubber-like polymer (a) which has such a particle size distribution that the weight percentage of the particles having a size of not less than 80 nm and less than 200 nm is 40 to 80% by weight, the weight percentage of the particles having a size of not less than 200 nm and less than 350 nm is 20 to 60% by weight, and the weight percentage of the particles having a size of not less than 350 nm is not more than 10% by weight, and which rubber-like polymer (a) has a glass transition temperature of not more than −40° C, and the content of the rubber-like polymer (a) in the rubber-reinforced resin (A) being 10 to 70% by weight.

3. A thermoplastic resin composition comprising 20 to 60 parts by weight of a rubber-reinforced resin (A) and 40 to 80 parts by weight of an aromatic polycarbonate (B) having a weight-average molecular weight of 16,000 to 30,000 ((A)+(B)=100 parts by weight), said rubber-reinforced resin (A) containing at least two following grafted rubber-like polymers, namely a first grafted rubber-like polymer (A11) obtained by graft polymerizing at least one first monomeric compound (b1) selected from the group consisting of aromatic vinyl compounds, vinyl cyanide compounds, (meth)acrylic ester compounds, acid anhydride monomeric compounds and maleimide-based compounds in the presence of a first rubber-like polymer (at) having a specified particle size distribution and a glass transition temperature of not more than −40° C., and a second grafted rubber-like polymer (A12) obtained by graft polymerizing at least one second monomeric compound (b2) selected from the group consisting of aromatic vinyl compounds, vinyl cyanide compounds, (meth)acrylic ester compounds, acid anhydride monomeric compounds and maleimide-based compounds in the presence of a second rubber-like polymer (a2) having a specific particle size distribution different from that of the first rubber-like polymer (a1) and a glass transition temperature of not more than −40° C, said grafted rubber-like polymers in the rubber-reinforced resin (A) having such a particle size distribution that the weight percentage of the particles having a size of not less than 80 nm and less than 200 nm is 40 to 80% by weight, the weight percentage of the particles having a size of not less than 200 nm and less than 350 nm is 20 to 60% by weight, and the weight percentage of the particles having a size of not less than 350 nm is not more than 10% by weight, and the content of the rubber-like polymers (a) comprising at least the first rubber-like polymer (a1) and the second rubber-like polymer (a2) in the rubber-reinforced resin (A) being 10 to 70% by weight, and the overall amount of the monomeric compounds (b) comprising at least the first monomeric compound (b1) and the second monomeric compound (b2) being 90 to 30% by weight (the sum of the overall amount of said rubber-like polymers (a) and the overall amount of said compounds (b) being 100% by weight).

4. A thermoplastic resin composition according to claim 1, wherein the rubber-reinforced resin (A) contains a polymer obtained by separately polymerizing at least one compound (b) selected from the group consisting of aromatic vinyl compounds, vinyl cyanide compounds, (meth)acrylic ester compounds, acid anhydride monomeric compounds and maleimide-based compounds.

5. A thermoplastic resin composition according to claim 2, wherein the rubber-reinforced resin (A) contains a polymer obtained by separately polymerizing at least one compound (b) selected from the group consisting of aromatic vinyl compounds, vinyl cyanide compounds, (meth)acrylic ester compounds, acid anhydride monomeric compounds and maleimide-based compounds.

6. A thermoplastic resin composition according to claim 3, wherein the rubber-reinforced resin (A) contains a polymer obtained by separately polymerizing at least one compound (b) selected from the group consisting of aromatic vinyl compounds, vinyl cyanide compounds, (meth)acrylic ester compounds, acid anhydride monomeric compounds and maleimide-based compounds.

7. A thermoplastic resin composition according to claim 1, wherein the weight-average molecular weight of the acetone-soluble matter of said rubber-reinforced resin (A), as determined by GPC with polystyrene calibration, is 60,000 to 180,000.

8. A thermoplastic resin composition according to claim 2, wherein the weight-average molecular weight of the acetone-soluble matter of said rubber-reinforced resin (A), as determined by GPC with polystyrene calibration, is 60,000 to 180,000.

9. A thermoplastic resin composition according to claim 3, wherein the weight-average molecular weight of the acetone-soluble matter of said rubber-reinforced resin (A), as determined by GPC with polystyrene calibration, is 60,000 to 180,000.

* * * * *